United States Patent
Baalsrud et al.

[11] 3,959,493
[45] May 25, 1976

[54] RUMEN BYPASS PRODUCTS COMPRISING BIOLOGICALLY ACTIVE SUBSTANCES PROTECTED WITH ALIPHATIC FATTY ACIDS

[75] Inventors: Nils-Ivar Baalsrud; Svein Ore, both of Oslo; Weiert Velle, Blommenholm, all of Norway

[73] Assignee: Rumen Chemie, AG, Glarus, Switzerland

[22] Filed: Sept. 18, 1974

[21] Appl. No.: 507,201

Related U.S. Application Data

[63] Continuation of Ser. No. 235,675, March 17, 1972, abandoned.

[30] Foreign Application Priority Data

| Mar. 17, 1971 | Norway | 1031/71 |
| Mar. 17, 1971 | Norway | 1030/71 |
| June 6, 1971 | Norway | 2115/71 |
| Sept. 24, 1971 | Norway | 3545/71 |

[52] U.S. Cl. .................... 426/2; 426/96; 426/98; 426/103; 426/307; 426/807; 424/38
[51] Int. Cl.² .......................... A23K 1/18
[58] Field of Search .......... 424/38; 426/2, 69, 807, 426/89, 96, 98, 103, 147, 212, 218, 72, 73, 307, 302, 648, 656

[56] References Cited
UNITED STATES PATENTS

| 3,037,911 | 6/1962 | Stoyle | 424/147 |
| 3,051,577 | 8/1962 | Babayan et al. | 99/166 |
| 3,089,824 | 5/1963 | Wurster | 424/38 |
| 3,265,629 | 8/1966 | Jensen | 426/218 |
| 3,538,215 | 11/1970 | Snyder et al. | 424/38 |
| 3,541,204 | 11/1970 | Sibbald et al. | 424/38 |
| 3,655,864 | 4/1972 | Grass et al. | 424/38 |
| 3,696,189 | 10/1972 | Snyder | 424/38 |
| 3,726,805 | 4/1973 | Maekawa et al. | 424/38 |

FOREIGN PATENTS OR APPLICATIONS

| 1,045,704 | 10/1966 | United Kingdom | 99/2 N |

OTHER PUBLICATIONS

Kirk-Othmer, Encyclopedia of Chemical Technology, Vol. 8, 1966, pp. 845-846.

*Primary Examiner*—Norman Yudkoff
*Assistant Examiner*—Curtis P. Ribando
*Attorney, Agent, or Firm*—Larson, Taylor and Hinds

[57] ABSTRACT

Substances having biological activity in ruminants, e.g. nutrients, medicaments and diagnostics, are protected during passage through the rumen with a fatty acid having at least 14 carbon atoms. These acids, which preferably form a continuous outer coating around the biologically active substance, are resistant to rumen conditions but release the active substance lower down the digestive tract where the fatty acids can also be utilised nutritionally.

15 Claims, 1 Drawing Figure

RUMEN BYPASS PRODUCTS COMPRISING BIOLOGICALLY ACTIVE SUBSTANCES PROTECTED WITH ALIPHATIC FATTY ACIDS

This is a continuation of application Ser. No. 235,675, filed Mar. 17, 1972, now abandoned.

The present invention relates to rumen by-pass products useful as a supplement to or a component of a ruminant feedstuff to increase the absorption of nutrient, to compensate for a negative energy and/or nutrient balance and to protect medicaments or diagnostic agents during their passage through the rumen. The invention also includes a method of administering the product to ruminants.

According to the invention, it is possible to supply ruminants with high energy sources, and biologically active substances in such a manner that these materials are not converted or released to any substantial degree during their stay in the rumen, but are available to the animal in those parts of the digestive tract beyond the rumen.

The present invention provides a rumen by-pass product for incorporation into a ruminant feedstuff comprising at least one biologically active substance coated with or completely or partly enclosed in a matrix of a saturated, straight or branched, substituted or unsubstituted aliphatic monocarboxylic acid having at least 14 carbon atoms in the molecule or a mixture of said saturated acid with an unsaturated, straight or branched substituted or unsubstituted aliphatic monocarboxylic acid having at least 14 carbon atoms in the molecule, or a salt of said acid or acid mixture; said acid or acid mixture or salt thereof being a different acid or acid mixture or salt thereof to the biologically active substance when the biologically active substance is one of said acids or acid mixtures or salts thereof; said acid or acid mixture or salt thereof being substantially resistant to rumen environment so that the biologically active substance is not released to any substantial degree in the rumen when the product is in the rumen.

By "biologically active substances" are meant substances normally subject to chemical reactions in the presence of the rumen content and/or rumen microflora or influencing said microflora. This class of substances includes ruminant nutrients that may be used individually or in any desired combination. The biologically active substances can be a carbohydrate, particularly glucose and/or glucogenous substances, that is substances that can be regarded as glucose precursors and cause formation of glucose in the ruminant. The biologically active substance can also be an aminoacid, e.g. methionine, or a fat, e.g. an animal fat which is a triglyceride of a fatty acid. The biologically active substance can also be a fatty acid, that is one of the aliphatic monocarboxylic acids having at least 14 carbon atoms of the type disclosed above, although, of course, when the biologically active substance is a fatty acid, it will be a different fatty acid to the fatty acid used to protect the biologically active substance during its passage through the rumen.

The products of the present invention can also contain medicaments or diagnostic agents as the biologically active substance and substances of this type which can be included in the products of the invention include antibiotics, sulphonamides, anti-helmintics and X-ray contrast media.

It is well known that ruminants are able to utilise certain nutrients which would otherwise be completely or partly undigested because the nutrients are first subjected to microbial treatment in the rumen which brings about a conversion to a digestible form. It is also known that this conversion in the rumen is not limited to otherwise undigestible substances, but, to a varying degree, also occurs with substances which it would have been desirable to let pass unchanged through the rumen. The present invention provides opportunities for letting nutrients and other substances pass substantially completely unattacked through the rumen so that their utilisation in the lower parts of the digestive tract of the ruminants is possible. The invention also provides the opportunity for protecting the processes normally taking place in the rumen against undesirable effects from the passing substances, e.g. abnormally high concentrations of the biologically active substances. The rumen may be regarded as a fermentation chamber only functioning optimally within narrow physical/chemical limits. Small changes, e.g. of pH, will easily disturb the fine symbiotical balance between various kinds of microorganisms, almost all of which have specific functions in the complex fermentation processes in the rumen. This makes it necessary to make certain physical/chemical demands to the total fodder ration for ruminants.

Figure 1:
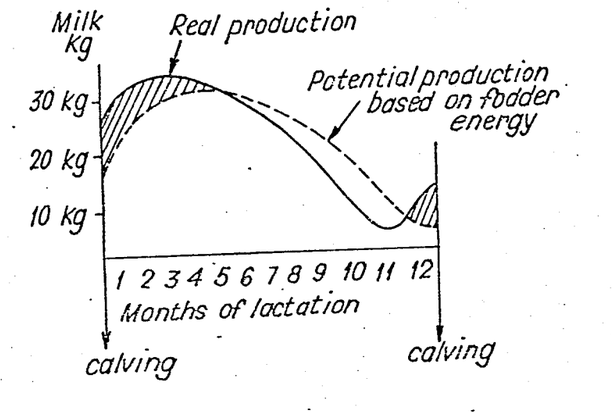

There are periods when ruminants have an exceptionally high need of nutrition which is often not catered for. A milk cow goes through two critical periods with a very high need of nutrition. The appetite of the cow changes during lactation, appetite here meaning the ability of absorbing fodder. The absorbed fodder should cover the demand of the cow for restoration and production (embryo growth and milk secretion). Especially high yielding milk cows have a capacity and an interval between calves which causes the total production during the last part of lactation to be larger than the absorption of fodder is able to cover. This is true even under the most favourable conditions. In the accompanying drawing the so-called potential product curve of production and the actual curve of production for cows is shown.

The hatched areas during the first 2–4 months of lactation and approximately the last 8 weeks of pregnancy are periods when the milk cow has a negative balance of energy. Under normal conditions, the cow will make up this deficit of energy by using up its own reserves, mainly its own body fat.

The periods when the cow has a deficit of energy are naturally very labile periods. When the appetite or the nutrition quality of the fodder is reduced, the discrepancy between the actual and the potential production curves will increase. This often causes reduced production, since the ability of the animal to mobilise fat from its own body deposits and to convert the fat in the liver is limited.

There is an analogous discrepancy between potential and active production curve in the last part of the pregnancy of sheep, especially in animals with two or more foetuses.

A discrepancy of energy can also result from environmental conditions such as temperature and fodder composition. Climatic conditions with high temperatures will cause a reduced appetite. Especially during high temperatures, the absorption of fodder may correspond to only 50% of the real need for nutrition. When the basal ration mainly consists of coarse fodder (silo fodder, hay, straw, etc.) the fodder volume may limit the amount of absorbed fodder and so prevent the nutritional needs being fully covered.

During certain periods, the animal will thus be in a negative balance of energy, and it will mobilise substances from its body depots to cover the deficit. These phases with a negative balance of energy naturally represent a heavy strain on the digestive apparatus of the animal and will, in many cases, cause the metabolic disorder ketosis, which, among others, is characterised by a lowered level of blood sugar and a raised level of ketones and of non-esterified fatty acids in the blood plasma as well as reduced willingness to eat and a reduced yield of milk. This is a metabolic disorder which is highly undesirable.

Glucose and/or glucogenous substance, are the most important nutrient and the most important source of energy for ruminants and such nutrients can be formulated according to the present invention, to meet the above-mentioned need of nutrition and energy.

Metabolic experiments with high yielding cows have shown that it is impossible to cover the demand for energy in the "negative balance" periods by conventional feeding methods. If glucose as such is administered to ruminants, it will be practically completely converted in the rumen into lower fatty acids in approximately the following ratio:

| | |
|---|---|
| Acetic acid | 57% by weight |
| Propionic acid | 22% by weight |
| Butyric acid | 21% by weight. |

Excessive feeding of easily digestible carbohydrates will cause a reduction of the pH in the rumen because of an excessive production of the above-mentioned volatile fatty acids as well as some $CO_2$ and $H_2O$. This fermentation of carbohydrates in the rumen explains the essential difference between ruminants and animals with only one stomach as regards the metabolism of glucose. In animals having only one stomach, glucose will be passed on to the liver through the intestine and will thus be subject to maximum utilisation in the animal, i.e. only a minor part of the glucose energy will be lost directly as heat. Most of the energy can be utilised by the animal for syntheses and muscle work. In ruminants, however, the glucose available to the liver from the intestine will be very little when ordinary fodder is given and the animals must cover their need for glucose by gluconeogesis, e.g. from propionate originating from the decomposition of carbohydrates in the rumen. In ruminants, ordinary feeding will only cause small amounts of glucose to be absorbed as such from the digestive tract. Carbohydrates in the fodder will generally cause formation of the above-mentioned lower fatty acids in the rumen, and the acids are absorbed and utilised as a source of energy for the organism. However, the loss of energy in the form of direct heat production is much higher for these acids than for glucose. In fed animals, the loss of energy is about 40–70 percent of the supplied amount of energy. For this reason, it is uneconomic to let the glucose be converted via fatty acids.

Highly lactating ruminants will easily develop a glucose deficit because glucose is the main precursor for lactose. A cow producing 30 kg. milk in 24 hours, loses approximately 1.5 kg. sugar in the milk in the form of lactose. More than 90 percent of the milk lactose is taken from blood glucose. Additionally, some glucose is continuously consumed in the cells of the animal. The total glucose consumption in a cow producing approximately 30 kg. milk in 24 hours will thus be considerably more than 2 kg. Since the cow normally absorbs only a small amount of glucose from the intestine, the main quantity of the glucose must be synthesised by the cow itself. For this synthesis, the cow mainly utilises propionic acid and glucose-producing amino acids. Since the synthesis demands energy it would be more economic if the cow could absorb the glucose directly in the blood. Here, however, the rumen is an obstacle. Decomposition of hexoses into lower fatty acids with a resulting loss of energy is the running penalty the ruminant must pay to be able to utilise the cellulose which is otherwise indigestible.

Annison and White have shown (Biochem. J. 162 (1961)) that in sheep, the utilisation of glucose is increased when administered intravenously. Bartly and Black have shown (J. of Natr. 89, 317 (1966)) that similar results are achieved when glucose is directly supplied to duodenum of lactating cows. In these experiments, up to 65 percent of the supplied glucose was directly utilised in the metabolism.

From the foregoing, the enormous importance of glucose to the balance of nutrition and energy, especially in periods of negative balance of energy, will be apparent.

Of the main nutrients for ruminants, namely protein, carbohydrates and fat, fat is the substance having by far the highest energy content by weight unit, namely 9.2 kcal/g.

As mentioned above, many of the fodder substances supplied to ruminants are converted by microbial activity in the rumen. A condition for normal utilisation of e.g. cellulose and other nutrients which are hard for ruminants to digest is that the rumen microbes have a favourable working environment. A series of experiments described in the literature have disclosed that microbial activity is restrained and/or the animal's fodder utilisation is reduced when the fat content of the fodder ration exceeds a certain comparatively low limit (6 to 8 percent).

Numerous experiments have been made with injection of fat into the fodder rations of milk cows. When the fodder contains larger amounts of fat, however, the rumen function becomes disturbed. In the experiments, the fat used was neutral fat mixed with the residual fodder in a finely divided form. This fat is hydrolysed and hydrogenated during formation of saturated fatty acids in the rumen. Neutral fat as well as the biodegraded free fatty acids will interfere in various ways with the biological composition of the microflora. It is not known with certainty whether the depressive effect of the fat on the micro-organisms in the rumen is due to the fact that the micro-organisms are "coated" by a fatty film which reduces the permeability of the cell membranes or that the free fatty acids form a film on the rumen epithelium and thus disturb the reception of the normal metabolites from the rumen fermentation.

Another purely physical/chemical condition which also provides certain limits for the addition of fat to fodder rations for ruminants is that the free fatty acids formed in finely divided form in the rumen will form more or less insoluble soaps with Ca- and Mg-ions in the rumen environment. This probably has most influence on the Mg-metabolism, as Mg is mainly absorbed through the rumen epithelium.

In connection with addition of large quantities of fat to fodder rations for large cattle, a number of researchers have disclosed that the digestion of other nutrient components, mainly cellulose, is also restrained if the fat content of the fodder is too high.

At the World Congress Animal Nutrition 1966, Vauschouhoek, after a very extensive survey of literature, concluded that it is not advisable to add more than 5 percent fat to a ration containing 2-3 percent fat for big cattle.

The National Render Association has also made a series of experiments with addition of fat to high yielding big cattle. These experiments were based on fodder rations with 3 and 8 percent fat respectively in the fodder. Even though the milk production in these experiments increased by 0.5-0.9 kg. per day for each 100 g. fat added to the fodder, this research organisation also suggested a comparatively low limit of fat to fodder for big cattle.

Whereas theoretically, it would be rational to use higher energy additives in the form of fat in ruminant fodder, the above-mentioned susceptibility of the rumen microbes to fodder of high fat content sets a comparatively low limit for the amount of fat to be virtually used. The daily maximum amount of fat in the fodder for a cow weighing 500-700 kg. is probably about 700 g. Any further increase of added fat causes an adverse effect on the digestive processes in the rumen and consequently a reduced yield.

Although most experiments involving addition of fat have been carried out with highly lactating big cattle, it is permissable to make comparisons with other ruminants, e.g. sheep. Researches made recently on cows as well as sheep disclosed that when ruminants are given higher fatty acids, e.g. stearic acid, directly into the intestine, so that it does not have to pass through the rumen, the animals surprisingly have an ability to utilise these substances. It has been found that stearic acid, administered directly into the blood stream of lactating cows results in increased synthesis of fat in the milk gland. When milk cows are given very large amounts of fodder, a so-called fat depressive effect (reduced fat content of milk) can very often be observed. This effect can be neutralised by direct administration of stearic acid to the milk gland.

The reactions normally taking place in the rumen also comprise the conversion of fatty matter. Unsaturated fatty acid chains are, to a large extent, hydrogenated into saturated ones and, in some instances, decomposed. In addition, the fat is hydrolysed into free fatty acids and glycerol. A characteristic final product of these processes is therefore unesterified saturated fatty acids. It has also been disclosed (cf. Garton, G.A. (1969) proc. Nutr. Soc. 28, 131) that unesterified saturated fatty acids are absorbed substantially completely during their passage through the small intestine of ruminants and especially in the central parts (jejenum).

The oral administration of medicaments and diagnostic agents to ruminants is also often complicated by the fact that the medicament or diagnostic agent is partially or sometimes even completely decomposed in the rumen as a result of attack by the rumen microflora or by the rumen juices generally. This means that the efficacy of the orally administered agents is often reduced.

In accordance with the present invention, medicaments and diagnostic agents to be administered orally to ruminants are protected against attack in the rumen by the aliphatic mono-carboxylic acid, acid mixture or salts thereof, mentioned above. The manner of coating the medicaments or diagnostic agents is exactly analogous to the manner of coating the nutrients discussed above and to be discussed below. In all cases, the biologically active material is protected during its passage through the rumen and is liberated in the lower parts of the digestive tract.

More than one medicament and/or diagnostic agent can be mixed together in the rumen by-pass products of the invention.

Methods of protecting nutrients and medicaments from the effect of rumen environment during the passage of these biologically active materials through the rumen have been previously proposed, e.g. in British Pat. Nos. 1,137,214 and 1,160,936 and Norwegian Pat. No. 120,058 but all the previous methods, although involving coating the biologically active substance with a coating which is stable to rumen environment but breaks down in the lower part of the digestive tract to release the biologically active substance, utilises a coating which is nutritionally inert and in no way beneficial.

The present invention utilises the good resistance of the higher saturated fatty acids in the rumen by using these fatty acids or unsaturated analogues thereof, or salts of these acids to protect other biologically active substances against the influence of the rumen content. At the same time, these protecting fatty acids or salts themselves can be utilised nutritionally in those parts of the digestive system of ruminants following the rumen. Oral administration of particulate fatty acid, which remains solid during its stay in the rumen, as opposed to finely divided fat in fodder, did not affect microbial activity in the rumen.

The fatty acids used in the invention are saturated straight or branched, unsubstituted or substituted aliphatic mono-carboxylic acids having 14 or more carbon atoms in the molecule (here called "fatty acids") or mixtures of these acids with unsaturated analogues thereof. Salts of said acids or acid mixtures which are not decomposed in the rumen to any substantial degree, e.g. metal salts can also be used. Thus the acid can be an alkanoic acid or a mixture of alkanoic and alkenoic acids, each containing at least 14 carbon atoms. Substituted acids can be used, where the substituent gives a non-toxic acid e.g. hydroxy or amino substituted acids. The upper limit on the number of carbons is not critical, straight chain acids containing 14-22 carbon atoms are preferred, but branched chain acids and acids containing up to 30 or more carbon atoms can also be used.

Such fatty acids and their salts of the mentioned kind are resistant against attacks in the rumen. Also, they are digestible in the abomasum and intestine of ruminants. This is a considerable advantage, from a physiological point of view, compared to previously known methods, in that non-esterified fatty acids form an important component of the normal metabolism of ruminants.

The product of the invention is preferably formulated as particles of size and density such that the particles are passed with the rumen content from the ventral rumen to reticulum and the digestive tract. Suitable sizes of particles and densities are to be found in "Physiology of Digestion in the Ruminant," London, Butterwork 1965, pages 119120, and in Lange's "Handbook of Chemistry," 9th edition, 1956, page 911. The lower limit of the size of particles of the present invention will be determined by the fact that very small particles, which form a suspension in the rumen content, will interfere with the biological composition of the rumen microflora. Practical experiments have disclosed that the most favourable results are achieved when the smallest dimension of the particles is less than 5 mm. preferably not less than 0.2 mm. The invention, however, does not set any definite upper limit to the size of particles, very large particles will be chewed down by the ruminant.

The density of the product of the invention will normally be in the range 0.8–1.4 and it is preferred to utilise a density in the range 1.0–1.4 to secure passage of the product through the rumen in an optimum time.

To secure the greatest degree of protection for the biologically active material during its passage through the rumen, it is preferred to utilise particles which have a continuous coating of the protecting fatty acid or salt. Such particles will have an inner core completely enclosed in the continuous protective coating. The inner core may consist essentially of the biologically active material or may consist essentially of biologically active material completely or partly enclosed in a matrix of the protecting fatty acid or salt. It is also possible to prepare particles which simply consist of the biologically active material partly or completely enclosed in a matrix of the fatty acid or salt but this embodiment is less preferred as there is a greater likelihood of the rumen juices or microflora gaining access to the biologically active material. It is convenient to prepare the particles initially in this matrix form but desirable to enclose the matrix subsequently in a continuous coating of fatty acid or salt. Components to vary the melting point, solubility, mechanical durability, colour, taste, density, etc. may also be introduced. Substances influencing the digestibility of the biologically active substance or the degree of protection may also be added. Several biologically active substances may be protected simultaneously.

The fatty acids supplied to a ruminant in the form of the products of the present invention will pass through the rumen substantially completely without modification and pass along to the intestine where they are dissolved and absorbed under the influence of gall and pancreatic juice. Pellets of a suitable size, shape and composition will, thus, rapidly pass on from the rumen to the intestine, and they thus permit up to 2–3 times the energy supply in the form of fat or fatty acids respectively than it is possible to achieve by the use of conventional feeding principles, and this without any significant depressive effect on the digestive process in the rumen.

As mentioned before, the fatty acids are an important component of the metabolism of ruminants, and the nature of the fatty acid content of the product should be taken into consideration having regard to whether the animal to be fed is a slaughter animal or a milk cow.

In slaughter cattle it is known that unsaturated fatty acids in fodder fat are almost totally hydrogenated in the rumen from which the saturated acids pass on to the intestine and are absorbed for incorporation in body fat, which will therefore consist to a large extent of so-called saturated fat. When unsaturated fatty acids (as biologically active substance) are incorporated in the product of the invention and are protected by saturated fatty acids, it will be possible to obtain slaughter cattle having a high percent of unsaturated fatty acids in the body fat, even though they are ruminants.

In milk cows it is known that stearic acid supplied to the milk gland is to a large extent dehydrogenated to oleic acid which is an important component of milk fat. Simultaneously, the stearic acid, as mentioned above, will counteract fat-depression in milk which is caused by large amounts of fodder. If stearic acid is made the main component of the fatty acid part of the product of the invention, the composition of the body fat will not be much influenced, whereas lactation will be positively influenced. The fatty acid part of the product can also, if desired, include polyunsaturated fatty acids which, after rumen by-pass, can increase the butterfat content of unsaturated acids.

A particularly valuable product for ruminants according to the invention is one containing both glucose and fatty acids. Glucose and fatty acids represent the starting materials for the esterification or fat production taking place in the intestine epithelium cells of ruminants. From the glucose, glucerophosphate is formed, which is necessary to form triglycerides in turn with the absorbed fatty acids.

In accordance with a further aspect of the invention, there is provided a method of feeding a ruminant which comprises administering orally to the ruminant a rumen by-pass product according to the invention whereby the product passes through the rumen without any substantial release of biologically active substance in the rumen and the biologically active substance and the said acid or acid mixture or salt thereof become available to the ruminant in a portion of the digestive tract beyond the rumen.

As explained in connection with FIG. 1, the oral administration of the rumen by-pass product is particularly valuable when a ruminant is in a "negative energy balance" situation. This is in the weeks before and after parturition and particularly during such periods, administration of the product at a daily rate of 30–300 g. is advantageous.

The rumen by-pass product of the invention has been described above on the basis that where the biologically active material is a fatty acid or salt thereof, it is different to the protecting fatty acid or salt thereof. However, the method of the invention can be modified so that the biologically active substance and the protecting fatty acid or salt are identical.

The present invention also includes a ruminant feedstuff in which is incorporated the rumen by-pass product of the invention.

The following experiments with ewes have been carried out to show the effects of the use of the product of the invention on important blood components of the ewes as well as on the live weight of ewes and lambs. For the experiment, six ewes pregnant with twin-lambs were chosen by X-ray examination. Twin pregnancy in ewes can cause ketosis during the last part of the pregnancy. Three animals serve as control animals and three serve as test animals.

At the start of the experiment on Apr. 1, 1971, all animals received an equal basis ration of fodder, i.e. hay with an energy-giving fodder (cow fodder mixture A). From April 12, to April 23 the ration was hay ad lib plus 0.3 kg. energy-giving fodder. From April 23 the amount of energy-giving fodder was increased to 0.5 kg. daily per animal. The test animals additionally received 150 pellets daily per animal in the period April 5 to April 28. These pellets prepared in accordance with the invention contained a total of 100 g. fatty acids ($C_{16}$–$C_{22}$ mixture) and 50 g. glucose, which corresponds to approximately 20% fat or fatty acids respectively in the energy-giving fodder. The total consumption of pellets was about 10.3 kg.

The experiments gave the following results:
1. Live weight

| (a) the ewes | Control group | Test group |
|---|---|---|
| At the start of the experiment April 1st | 245.5 kg | 243.5 kg |
| April 16 (Lambing April 16 to 21) | 251.5 kg | 250.0 kg |
| April 28 | 190.5 kg | 198.5 kg |

As will be seen the pellet supply resulted in higher weight during lactation (totally 10 kg.).

| (b) the lambs | Control group | Test group |
|---|---|---|
| Weight at birth | 27.5 kg | 26.5 kg |
| 7 days old | 38.3 kg | 39.1 kg |

In spite of the fact that an old ewe born 1964 in the test group had lambs with low birth weights, the pellet supply resulted in a total increase during the first 7 days which is 1.8 kg. larger than that of the control group.

2. Blood Components

Acetoacetate (ketone bodies) in blood plasma is the best known indicator of the degree of fat mobilisation from the depots of the animal and of the degree of ketosis, and is thus measured in the experiment.

The blood sugar value will decrease in a case of ketosis and is included as well.

Free acids of the kind used in pellets could possibly interfere with the blood content of Ca and Mg. These substances are consequently measured too.

In a case of ketosis, the of nonesterified fatty acids in the blood plasma will usually increase, but since considerable amounts of fatty acids are supplied, it is difficult to say in advance how this component would turn out in the blood plasma. Nevertheless, it is found interesting also to measure the fatty acids.

Two tests are made before the pellet supply is started and during the period of pellet supply, 7 tests are made from each animal.

a. Acetoacetate (ketone)

| | Control group | Test group |
|---|---|---|
| Average of all animals and tests | 1.138 mg/100ml | 0.407 mg/100ml |

Statistics on the total test material show a $p < 0.001$ on the difference between the control group and the test group, where the test group is lowest. A fact that does not appear from the figures is that the increase of the acetoacetate level after lambing is markedly lower for all animals in the test group than for the animals of the control group. This strongly indicates that pellets have dampened the endogenous mobilisation of fat, which means that the test animals have a better energy balance.

b. Blood sugar

| | Control group | Test group |
|---|---|---|
| Average of all animals and tests | 68.4 mg/100 ml | 71.4 mg/100 ml |

The test animals are better off here too, but the difference is not statistically significant.

c. Calcium and magnesium

| | Control group | | Test group | |
|---|---|---|---|---|
| | Ca | Mg | Ca | Mg |
| Average of all animals and tests | 10.60 mg/100 ml | 2.62 mg/100 ml | 10.15 mg/100 ml | 2.70 mg/100 ml |

It appears that both calcium and magnesium values are quite normal for both groups. The addition of fatty acids has not caused hypomagnesemia, which one would expect with such a high addition of fat if the acids had been completely dispersed in the rumen (approximately 20 percent fat or fatty acids respectively in the energy giving fodder). These results alone show that an effective by-pass has been achieved.

d. Non-esterified fatty acids

| | Control group | Test group |
|---|---|---|
| Average of all animals and tests | 1270 microequiv./l | 764 microequiv./l |

From this result it is apparent that the effect of pellet supply is at least as marked when measured on the plasma level of non-esterified fatty acids as when measured on the acetoacetate level. It is interesting that there is no "overlap" between the control group and the test group in the averages for each animal. The difference between the control group and the test group is significant (56 tests totally).

The physiological effect of saturated long chained fatty acids combined with glucose, verifies the physical experiments made earlier to examine the by-pass effect of such pellets. There is a real by-pass of the rumen by the pellets and no interference with the microbial activity in the rumen was observed resulting from the addition of these large amounts of "fat."

The apparently paradoxical effect on the physical parameters, that is, a reduced content of free fatty acids (NEFA) and ketones, achieved in these experiments may, in a very simplified manner, be explained in the following way: The increased free fatty acids (NEFA) as well as the increased content of ketones in the blood of high yielding ruminants appears when there is a discrepancy between supplied energy and production. Both values express a mobilisation of fat from the animal's own depots to cover the need of energy for production (embryo and milk). The mobilised fat is decomposed in the depots into free fatty acids (NEFA) and glycerol and passed on to the liver. The free fatty acids supplied to the liver by the mobilisation of fat from the animal's own depots will be converted in the following three alternative ways:

1. Esterification to triglycerides. The neutral fat will partly be incorporated in the liver cells, i.e. approximately 20percent, and this portion is independent of the NEFA-amount. The main amount will be converted to lipo-proteins and carried into the blood circulation.
2. Complete oxydation to $CO_2$ and to tricarboxylic acid cycle.
3. If the above two manners of conversion decrease because of too large supply of NEFA or deficiency of glucose, only a partial oxidation of the fat will occur in the liver. The result is an increased formation of ketones in the blood.

When this apparently paradoxical result, that is, a decreased content of both NEFA and ketones, was achieved in spite of the supply of considerable amounts of fatty acids per os, this is due to the fact that fat resorbed through the intestine is converted in an essentially different manner in the animal. Long chained fatty acids (NEFA) resorbed from the intestine will be converted into fatty acid-coenzyme-A-derivatives in the intestine epithel through the resorption among others involving coenzyme A and adenosine triphosphate (A.T.P.). These fatty acid compositions will be converted to triglycerides by a reaction with glycerol formed from glucose. This phase of the triglyceride synthesis in the epithel cells of the intestine occurs via glycerol phosphate, which primarily originates from the glucose metabolism in said cells. The triglyceride synthesis in the epithel cells is followed by an incorporation of phospho-lipids and small amounts of protein in the "membrane" enclosing the "fatty particles," the chylomicrones, which through the lymph enter the common circulation of the animal (through the ductus thoracicus to the heart and the arterial circulation).

The free fatty acids offered to the animal in the intestine, and which are resorbed, will thus be converted into triglycerides, which are supplied partly to the liver, partly to fatty tissue, partly to milk glands, and partly to the muscles. The chylomicrones thus being offered to the various tissues will be rapidly absorbed and disappear from the blood stream.

Much simplified, it could be said that the explanation of the above mentioned paradoxical effect of increased supply of long chain free fatty acids to the intestine is due to the fact that the free fatty acids are converted in the epithel cells in the intestine and distributed as triglycerides in the form of chylomicrones. This distribution will not be exclusively directed to the liver as the sole organ of conversion, but directed to the various tissues in the organism. Thus, the metabolic stress to which the liver is subjected as regards the conversion of NEFA from the animal's own fat depots is considerably reduced. The most important energy demanding organ of high yielding cattle (and sheep), the milk gland, will thus have more of its demand of energy covered by resorption of large quantities of long chain saturated fatty acids directly from the intestine.

The following Examples are given to illustrate the invention. The preparations described in Examples 1–3 are tested in vitro as to the durability of the protective coating against attacks from rumen juice. The following tests are used:

a. The preparations are incubated in freshly removed sheep rumen juice at 39°C with shaking for the stated periods. The physical properties of rumen juice are not, of course, always constant.
b. The preparations are incubated in ox gall and pancreatic juice of approximately physiological concentration at 39°C with shaking for 24 hours. All preparations mentioned below are essentially fully dissolved in this treatment.

The following methods of analysis are used in the Examples.
A. Loss of glucose from the preparations measured by tracer technique, $C^{14}$ glucose being used;
B. residual glucose in the preparation after incubation is determined colorimetrically (autoanalyser);
C. loss of methionine and casein is measured by microKjelldahl analysis;
E. especially resistant preparations were estimated gravimetrically and visually;
F. dissication after feeding experiments. Parts and percentages mentioned in the Examples are by weight.

EXAMPLE 1

A technical fatty acid mixture ("stearic mix") of the following composition is used, the amounts being in % by weight:

10% myristic acid (tetradecanoic acid)
33% palmitic acid (hexadecanoic acid)
27% stearic acid (octadecanoic acid)
17% arachidic acid (eicosanoic acid)
8% behenic acid (docosanoic acid)
5% other components 43 parts of the fatty acid mixture are melted at 75°–80°C and mixed with 40 parts of glucose and 17 parts of animal fat and the mixture formed into pellets in which the glucose is embedded in a matrix of the stearic mix. The preparation was estimated by methods A and B which show a loss of glucose after 24 hours of 56%. The residence time of the pellets in the rumen under field conditions would normally be very much less than 24 hours.

EXAMPLE 2

The procedure of Example 1 is repeated using 43 parts stearic acid, 40 parts of glucose and 17 parts of animal fat. Analysis method B shows a loss of glucose after 24 hours of 55 percent.

EXAMPLE 3

Example 2 is repeated using palmitic acid in place of stearic acid. Analysis method B shows a loss of glucose after 24 hours of 59 percent.

By way of comparison, when Example 1 is repeated using 50 parts lauric acid (dodecanoic acid), 30 parts glucose and 20 parts animal fat, the preparation completely dissolves in rumen juice.

EXAMPLE 4

Oleic acid is mixed with glucose and the technical fatty acid mixture as mentioned in Example 1 and the mixture pelletised to give a preparation of the following approximate composition

| | |
|---|---|
| Myristic acid | 4% |
| Palmitic acid | 13% |
| Stearic acid | 12% |
| Arachidic acid | 7% |
| Docosanoic acid | 3% |
| Oleic acid | 20% (9-octadecenoic acid, cis) |
| Glucose | 40% |

Analysis method B shows a loss of glucose after 24 hours of 47 percent.

EXAMPLE 5

Example 4 is repeated so that the oleic acid content is 15 percent. Analysis method B shows a loss of glucose after 24 hours of 49 percent.

EXAMPLE 6

Example 4 is repeated so that the oleic acid content is 25 percent. Analysis method B shows a loss of glucose after 24 hours of 41 percent.

EXAMPLE 7

Example 4 is repeated so that the oleic acid content is 30 percent. Analysis method B shows a loss of glucose after 24 hours of 43 percent.

EXAMPLE 8

Example 4 is repeated but using ricinoleic acid (cis-d-12-hydroxy-9-octadeconoic acid) in lieu of oleic acid so that the pellets contain 20 percent ricinoleic acid. Analysis method B shows a loss of glucose after 24 hours of 49 percent.

EXAMPLE 9

Example 1 is repeated using 40 percent casein in place of glucose. Analysis method C shows a loss of casein after 24 hours of 17 percent.

EXAMPLE 10

Example 1 is repeated using 40 percent of 1-methionine in place of glucose. Analysis method C shows a loss of methionine after 24 hours of 43 percent.

EXAMPLE 11

Biologically active substances in the form of pearls e.g. glucose, each with a weight of 100–200 mg, is coated with the fatty acid mixture mentioned in Example 1. The gauge of the coating is varied so as to form up to 55 percent of the weight of the coated pearls which have a core of the biologically active substance. Analysis method E shows that pearls containing more than about 10% fatty acid coating were uninfluenced by rumen juice after 24 hours, and no loss of biologically active substance occurred.

EXAMPLE 12

A mixture containing 45% of the technical fatty acid mixture mentioned in Example 1, 20% animal fat, 5% calcium carbonate and 30% glucose is prepared and formed into granules. Analysis method B shows a loss of glucose after 24 hours of 52 percent.

EXAMPLE 13

The preparation described in Example 12 is used for the following feeding test:

Three lambs, each one year old, are each fed 300 g of the Example 12 granules, mixed with 300 g conventional feed. The lambs are slaughtered 18, 12 and 8 hours respectively after the feeding started.

Lamb No. 1 (18 hours)

A small amount of granules of the preparation, partly of reduced size, is left in rumen, reticulum and omasum. In the jejunum, ileum, caecum and colon, there is practically no trace of granules.

Lamb No. 2 (12 hours)

Considerable amounts of almost intact granules are found in the rumen and reticulum, in the omasum single grains are found, in the abomasum only pieces of the granules while, in the jejunum, ileum, caecum and colon no traces of the granules are found.

Lamb No. 3. (8 hours)

Many intact granules are found in the rumen and reticulum, some in the omasum and abomasum, while no traces in the lower portions of the digestive tract are found.

EXAMPLE 14

A mixture of 60 percent of the technical fatty acid mixture described in Example 1 is mixed with 40% glucose and formed into pellets. Analysis method B shows a loss of glucose after 8 hours of 59.2% and after 24 hours of 73% in the rumen juice.

EXAMPLE 15

The pellets of Example 14 are coated with the same technical fatty acid mixture so that the glucose of the coated pellet is reduced to 25 percent and the fatty acid part is increased to a total of 75 percent. Analysis method B shows no loss of glucose after 8 hours or after 24 hours.

EXAMPLE 16

The procedure of Example 15 is repeated so that the glucose content of the coated pellet is 34 percent and the fatty acid content if 66 percent. Analysis method B shows after 8 hours a glucose loss of 13.5 percent and after 24 hours a loss of 33.5 percent.

EXAMPLE 17

Example 1 is repeated replacing part of the glucose by histamine, so that the histamine content of the pellet is 2 percent.

EXAMPLE 18

The pellets described in Example 17 are fed to a ram-goat. It is known that histamine is almost completely decomposed in the rumen, and that resorbed histamine is metabolized and discarded through the urine partly as histamine, partly as metabolites of this compound. The ram-goat was fed 2 g of histamine in the form of the pellets. The histamine concentration in the urine (Analysis method D) proved to be 4 times what would be normal when an equal amount of unprotected histamine is supplied to the rumen. The ram-goat showed clear clinical indications of histamine influence. The liberation of histamine in the intestine occurred gradually over 10–12 hours from the pellets.

EXAMPLE 19

Example 1 is repeated using 40 percent of basic bismuth subnitrate in place of glucose. The pellets are used as a contrast material in a feeding test on a goat.

Due to its high density, the passage of this preparation through the rumen is much slower than that of the preparations mentioned earlier.

EXAMPLE 20

Pellets of approximately 25 mg weight are prepared from one of the following two compositions:

|  | Composition 1 | Composition 2 |
|---|---|---|
| Sulfadimidine | 40% | 20% |
| Glucose | — | 20% |
| "Stearic mix" (see Example 1) | 45% | 45% |
| Oleic acid | 15% | 15% |

The pellets are incubated with shaking for 25 hours in freshly extracted rumen juice and in bile to which lipase has been added. The incubated pellets are then washed in distilled water and dried over sulphuric acid in a vacuum drier over-night, and then weighed and the loss of weight during incubation determined in % of the original weight. The following results are obtained:

|  | Rumen content | Gall with lipase |
|---|---|---|
| Composition 1 | 3.6 | 52 |
| Composition 2 | 6.2 | 72 |

In in-vitro tests, the pellets from Composition 1 or 2 released practically no material in the rumen juice, whereas in gall to which lipase had been added, about 50 and 70 percent was dissolved respectively. Thus, the pellets are practically uninfluenced by the rumen content, but will dissolve in the intestine. In this way, the sulfa preparation is absorbed to the blood without harming the rumen microflora. A chemical analysis of the rumen juice disclosed a loss of 20 percent of the sulfadimidine from the pellets of both compositions after 24 hours of incubation.

For ruminants, it is desirable to treat certain infectious diseases with sulfa preparations by oral administration but for this purpose, existing preparations are unsatisfactory because of their undesirable effect on the rumen microflora.

EXAMPLE 21

A mixture of 60 percent of the fatty acid mixture described in Example 1 and 40 percent of a water soluble oxytetracycline chloride mixture containing 55 mg. oxytetracycline chloride per gram is formed into pellets. The pellets are then coated with the same fatty acid mixture so that the coated pellets contain a total of 25% oxytetracycline chloride and 75% fatty acids. Analysis method B shows no loss of oxytetracycline chloride after incubation in rumen juice for 8 hours or for 24 hours.

We claim:
1. A rumen by-pass product for oral administration to a ruminant comprising a plurality of particles each having a minimum dimension of 0.2 mm. and a specific gravity of 0.8–1.4, each of said particles comprising:
a biologically active substance useful for administration to the post rumen portion of the digestive tract of a ruminant, said biologically active substance being subject to chemical reaction in the presence of the rumen content or having an undesired effect on the processes normally taking place in the rumen, said biologically active substance comprising glucose or a glucogenous substance present in an amount of up to 40% by weight of said particle; and
a protective substance substantially resistant to rumen environment present in an amount of at least 60% be weight of said particle and sufficient to prevent release of said biologically active substance to any substantial degree in the rumen when said particle is in a rumen, said protective substance being digestible lower down the digestive tract of said ruminant for release of said biologically active substance therein, said protective substance being present at the surface of said particle and consisting essentially of a mixture of saturated and unsaturated unsubstituted aliphatic fatty acids having from 14–22 carbon atoms, said unsaturated acids being present in an amount of up to 30% by weight of said mixture.

2. A method of administering to a ruminant a biologically active substance useful in the post rumen portion of the digestive tract of a ruminant, said biologically active substance being subject to chemical reaction in the presence of the rumen content or having an undesired effect on the processes normally taking place in the rumen, said biologically active substance being selected from the group consisting of nutrients and medicaments;
said method comprising orally administering to a ruminant a rumen by-pass product comprising a plurality of particles each having a minimum dimension of 0.2 mm. and a specific gravity of 0.8–1.4, each of said particles comprising:
up to 40% by weight of said biologically active substance; and
a protective substance substantially resistant to rumen environment present in an amount of at least 60% by weight of said particle and sufficient to prevent release of said biologically active substance to any substantial degree in the rumen when said particle is in a rumen, said protective substance being digestible lower down the digestive tract of said ruminant to release said biologically active substances therein, said protective substance being present at the surface of said particle and consisting essentially of a mixture of saturated and unsaturated unsubstituted aliphatic fatty acids having from 14–22 carbon atoms, said unsaturated acids being present in an amount of up to 30% by weight of said mixture.

3. A method according to claim 2 wherein said ruminant is a sheep.

4. A method according to claim 2 wherein said ruminant is bovine.

5. A method according to claim 2 wherein said rumen by-pass product is orally administered to said ruminant in an amount of 30–300 grams per day.

6. A method according to claim 2 wherein said ruminant is a high milk yielding female, said biologically active substance comprises glucose, and said rumen by-pass product is orally administered for a period of more than two weeks before and after parturition.

7. A method according to claim 2 wherein said biologically active substance comprises a ruminant nutrient.

8. A method according to claim 7 wherein said ruminant nutrient comprises glucose or a glucogenous substance.

9. A method according to claim 7 wherein said nutrient comprises an amino acid.

10. A method according to claim 7 wherein said nutrient comprises a triglyceride of a fatty acid.

11. A method according to claim 2 wherein said biologically active substance comprises a medicament.

12. A method according to claim 2 wherein said medicament is selected from the group consisting of antibiotics, sulfa drugs and anti-helmintics.

13. A method according to claim 2 wherein said protective substance is mixed with said biologically active substance, said biologically active substance being dispersed in a protective matrix of said protective substance.

14. A method according to claim 2 wherein said biologically active substance is encapsulated within a protective outer layer of said protective substance.

15. A method according to claim 2 wherein said unsaturated acids are present in an amount of at least 15% of said mixture.

* * * * *